United States Patent [19]

Fink et al.

[11] 4,268,549

[45] May 19, 1981

[54] SYNTHETIC RESIN POWDER AND COATING AGENTS CONTAINING THE SAME

[75] Inventors: Herbert Fink, Bickenbach; Norbert Suetterlin, Ober-Ramstadt; Horst Dinklage, Darmstadt-Arheilgen; Willi Tilch, Reinheim, all of Fed. Rep. of Germany

[73] Assignee: Röhm GmbH, Darmstadt, Fed. Rep. of Germany

[21] Appl. No.: 56,541

[22] Filed: Jul. 11, 1979

[51] Int. Cl.³ .............................................. B05D 3/02
[52] U.S. Cl. ..................... 427/393.5; 260/29.7 UA; 260/29.7 T; 427/389.9; 427/412; 427/412.4; 428/287; 428/520; 428/904; 525/228; 526/329.1
[58] Field of Search ................. 427/195, 385.5, 393.5, 427/393.6, 388.2, 388.4, 389.7, 389.9, 391, 393, 396, 421, 412, 412.4, 430.1; 260/29.6 RB, 29.6 NB, 29.6 RW, 29.6 TA, 29.6 H, 29.7 R, 29.7 UA, 29.7 H, 29.7 T; 525/228; 526/329.1, 323.2, 329.7; 428/473, 904, 518, 520, 287

[56] References Cited

U.S. PATENT DOCUMENTS

| | | | |
|---|---|---|---|
| 3,786,013 | 1/1974 | Peters et al. | 525/228 |
| 3,876,578 | 4/1975 | Takada et al. | 260/29.6 RB |
| 4,126,594 | 11/1978 | Peters et al. | 260/29.4 UA |
| 4,166,882 | 9/1979 | Das et al. | 427/385 C X |
| 4,168,255 | 9/1979 | Lewis et al. | 427/385 B X |

FOREIGN PATENT DOCUMENTS

| | | |
|---|---|---|
| 1297266 | 6/1969 | Fed. Rep. of Germany . |
| 734181 | 7/1955 | United Kingdom . |
| 830311 | 3/1960 | United Kingdom . |

*Primary Examiner*—Michael R. Lusignan
*Assistant Examiner*—Thurman K. Page
*Attorney, Agent, or Firm*—Curtis, Morris & Safford

[57] ABSTRACT

What is disclosed is a synthetic resin powder of latex particles having an average particle size between 1 micron and 5 microns, which particles can be partially or completely loosely aggregated to form larger particles, said synthetic resin being a cross-linked copolymer of 75 to 99.5 percent by weight of a monomer mixture of methyl methacrylate and isobutyl methacrylate in a weight ratio of 1:3 to 3:1, 0.5 to 10 percent by weight of a cross-linking comonomer having at least two polymerizable double bonds, and 0 to 24.5 percent by weight of a further different ethylenically-unsaturated comonomer copolymerizable therewith, a coating agent containing a binder dissolved or dispersed therein together with such a resin powder, and a method of coating using such a coating agent to give coatings wherein the presence of the resin powder prevents blocking of the coatings without undue loss of luster therein.

7 Claims, No Drawings

SYNTHETIC RESIN POWDER AND COATING AGENTS CONTAINING THE SAME

The present invention relates to synthetic resin powders which are suitable as an additive to coating agents for the preparation of shiny, non-blocking, elastic coatings, to coating agents containing such powders, and to methods for coating a substrate with such coating agents.

Elastic coatings are applied to soft or flexible substrates, for example artificial leather, or may also be applied to rigid substrates if the coatings are to show a good resistance to impact stresses. The disadvantage of coatings of this type often is that two surfaces coated with such coatings adhere to each other on contact and can be slid past each other only with difficulty. This behavior is characterized as "blocking".

A conventional means for hindering blocking comprises the addition of finely divided silicic acid to a coating mixture. Although good slip properties can be attained in the coated substrates in this manner, the addition of silicic acid is undesirable if shiny coatings are to be produced, since this additive effects a matting of the surface. If the amount of this additive is sufficiently low that shiny coatings are produced, then the coatings are not sufficiently slippery. The same disadvantages are true for a multiplicity of synthetic resin powders which have been proposed as additives to coating agents instead of silicic acid. Thus, according to certain prior art, the addition of polyester particles to a film-forming coating material leads to the formation of matte coatings.

According to the teachings of still other prior art, dispersions of polyvinylidene chloride are combined with polyvinyl chloride powder having a particle size of less than 10 microns and give non-blocking coatings. However, the effect of the added synthetic resin powder is lost again if the coating is subsequently treated on a heated embossing calender. Further, the polyvinyl chloride polymer is not suitable as an additive imparting block-resistant properties for solutions of coating agents in organic solvents, since the latter then also dissolve the polyvinyl chloride.

In still other prior art, cross-linked synthetic resin powders having a particle size of not more than five microns are proposed as block-resistant and slip-imparting additivies for aqueous dispersions of coating agents. Because of the cross-linking, the synthetic resin powders are also stable to post-treatment on a hot embossing calender and are insoluble in organic solvents. They can comprise different monomers, for example lower alkyl acrylates or lower alkyl methacrylates. Preferably, cross-linked polystyrene powders or polymethyl methacrylate powders are used.

Although freedom from blocking and good slip properties can be achieved with these additives, the luster of the coatings is not completely satisfactory. An improved luster can only be attained by a reduction of the amount of additive, which brings with it a tendency toward blocking and reduced slip. Thus, the problem was presented of finding synthetic resin powders as additives for coating agents, which powders would permit the preparation of lustrous non-blocking coatings having good slip properties.

The synthetic resin powders according to the present invention, which are latex particles with an average particle size from 1 to 5 microns of a cross-linked copolymer comprising 0.5 to 10 percent of a cross-linking comonomer having at least two polymerizable double bonds, 75 to 99.5 percent by weight of a monomer mixture of methyl methacrylate and isobutyl methacrylate in a weight ratio from 1.3 to 3:1, and 0 to 24.5 percent by weight of at least one further different monomer copolymerizable therewith, meet this requirement. Their effect, like that of known powdery additives for coating agents, may be because the powder particles project as small irregularities above the surface of the coating and hinder an intimate contact between two surfaces which are touching one another. Such irregularities influence the surface luster. The avoidance of blocking and the improvement of slip may, thus, be fundamentally linked with a certain impairment of the luster. It was not foreseeable that just the synthetic resin powders of the present invention, which comprise methyl methacrylate and isobutyl methacrylate, would permit the achievement of a particularly advantageous compromise between high shine on the one hand and good resistance to blocking and good slip properties, on the other hand.

The advantageous effect of the powder according to the present invention is essentially linked to an observance of the limits of particle size, i.e. between 1 micron and 5 microns. The particle sizde is determined using a photograph taken with an optical microscope. The preferred particle size region is between 1.5 microns and 3 microns. A uniformity of the particle size permits the use of relatively small amounts of additive, whereby the impairment of luster can be kept particularly slight. Powders having less than 10 percent of primary latex particles above and below a particle size from 1 micron to 5 microns are thus particularly preferred.

As a rule, the cross-linked polymer powders solely comprise methyl methacrylate and isobutyl methacrylate together with a cross-linking agent. As cross-linking agents, those compounds having at least two carbon-carbon double bonds and which are copolymerizable with the aforementioned methacrylic acid esters are suitable, as is known. Conventional cross-linking agents of this kind are the dimethacrylates or diacrylates of ethylene glycol, of propylene glycol, of butane diol-1,4, or of diglycolether, and other difunctional or polyfunctional esters of dihydroxy compounds or polyhydroxy compounds, as well as divinyl benzene or divinyl esters of organic dicarboxylic acids. For use of the powders in aqueous coating agent dispersions, particularly if no hot calendering of the coating is intended, small amounts of cross-linking agents are sufficient, whereas for use in coating agents in organic solutions as well as in coatings which are to be hot calenderable, a strongly cross-linked synthetic resin powder with, preferably, from 3 to 10 percent of the cross-linking comonomer is suitable.

The advantageous properties of the new synthetic resin powders are also evinced if the mixture of methyl methacrylate and isobutyl methacrylate is only present in amounts of at least 75 percent by weight, and the remaining portion, in addition to the cross-linking monomer, is formed from some other ethylenically-unsaturated comonomer copolymerizable with the other monomers. The comonomer is so chosen that it does not disadvantageously influence the properties of the powder. For example, other esters of acrylic acid and methacrylic acid, styrene, acrylonitrile and methacrylonitrile, vinyl acetate, vinyl propionate, and vinyl butyrate, or similar, preferably water-insoluble or only slightly water-soluble monomers can be used.

It is advantageous if the powder particles are spherical. They are suitably prepared by emulsion polymerization according to the so-called seed latex method and by spray drying using conditions under which the individual particles do not fuse to one another. Under such conditions, the particles as a rule aggregate to form larger particles wherein the primary latex particles, however, only combine so loosely together that when they are stirred into a liquid coating agent they dissociate again to form individual particles.

The powders according to the present invention are preferably distributed in coating agents which form non-pigmented clear films. Suitably, the amounts of additive are between 2 percent and 50 percent, preferably from 10 to 30 percent, by weight of the binder in the coating agent. The coating agents fundamentally contain a volatile liquid component. The binder portion can be, for example, from 5 to 60 percent by weight of the total coating agent mixture.

Typical binders used as solutions are, for example, acrylic resins, polyvinyl chloride, polyurethanes, polyamides, or cellulose esters such as cellulose acetate-butyrate. As binders used in the form of dispersions, polyvinyl acetate, polyvinyl chloride, polyvinylidene chloride, polyacrylates, styrene-acrylate-copolymers, or copolymers of butadiene with styrene or acrylonitrile come into consideration, for example.

The use of acrylic resins, preferably in combination with polyvinyl chloride, as a binder is particularly advantageous. By "acrylic resins" are to be understood polymers or copolymers which comprise at least 80 percent by weight of esters of acrylic acid or methacrylic acid with alcohols having from 1 to 8 carbon atoms. The qualitative and quantative composition of acrylic resins depends in a known manner on the ability of the aforementioned esters to impart hardness or extensibility to the polymer. The binder can be in the form of an aqueous dispersion having, for example, from 10 to 60 percent by weight solids content. The average particle size of the dispersion should not be greaer than 0.3 micron in order to achieve a high luster. The dispersions contain conventional emulsifying agents which simultaneously bring about a dispersion of the added synthetic resin powder.

Preferably, organic binder solutions are employed, particularly those having a solids content from 5 to 40 percent by weight. For acrylic resin binders, chlorohydrocarbons, aromatic hydrocarbons, volatile esters or ketones are suitable as solvents, for example. The viscosity of the binder solution suitably lies in the region from 10 mPa.s to 50,000 mPa.s, since in this region advantageous working properties for most coating methods are present and the added synthetic resin powder shows only a slight tendency toward settling.

Coating agents having a content of the powder according to the present invention can be applied to substrates using all conventional coating methods, for example by spraying with or without air, by painting, printing, pouring, or dipping. The coating agent is so dosed that after evaporation of the liquid component a closed film of the desired thickness remains. Drying can take place at an elevated temperature, for example between 60° C. and 180° C., without impairment of the film properties. Subsequently, the coating can be treated with a smooth calender or an embossing calender, or in other ways.

The coatings can be applied to substrates of all kinds, for example to metal, synthetic resins in the form of films, sheets, or shaped parts, to wood, to asbestos cement, to glass, or to ceramic material. Preferably, the coatings are used for coating flexible substrates such as artificial leather, leather, synthetic resin tarpaulins, synthetic resin films, paper, cardboard, or textile fabrics. The powders according to the present invention have proved particularly advantageous in coatings on synthetic resins which contain plasticizers, particularly on plasticized polyvinyl chloride. Coatings on these substrates have an increased tendency to become tacky, which is attributable to a migration of the plasticizer into the coating layer. The powders according to the present invention absorb practically none of the plasticizers usually employed in polyvinyl chloride (PVC) and retain their advantageous properties for an unlimitedly long time. For this reason, coating agents comprising an acrylic resin having a content of the powder according to the present invention are a particularly advantageous embodiment of the invention when used as a final coating for PVC coatings containing a placticizer, such as PVC synthetic leather and PVC tarpaulins.

A better understanding of the present invention and of its many advantages will be had from the following specific Examples, given by way of illustration. In each case, the amounts of materials recited (parts or percent) relate to parts by weight or percent by weight.

EXAMPLE 1

Polymerization (1.1) Cross-linked polystyrene

First stage 1200 parts of completely desalted water are introduced into a heatable polymerization apparatus comprising a two liter Witt vessel with a blade stirrer and thermometer and heated to 80° C. Subsequently, 6.0 parts of ammonium peroxidisulfate and 5 parts of a mixture comprising 95 percent of styrene and 5 percent of glycol dimethacrylate are added. After five minutes, the remaining 295 parts of the mixture of 95 percent of styrene and 5 percent of glycol dimethacrylate are added dropwise over a period of one hour. After addition is complete, the mixture is stirred for 60 minutes at 80° C., then cooled and filtered over a VA-mesh (stainless steel) sieve.

The dispersion obtained is free of coagulation and has a solid content of 19–20 percent. The average particle size diameter is about 0.65–0.7 micron.

Second Stage

In a polymerization apparatus like that in the first stage, 280 parts of completely desalted water and 45 parts of the above-mentioned dispersion of the first stage are heated to 80° C. Subsequently, 0.18 parts of ammonium peroxidisulfate is added and an emulsion comprising of 454 parts of styrene, 23.8 parts of glycol dimethacrylate, 800 parts of completely desalted water, 0.68 part of sodium lauryl sulfate, and 1.6 parts of ammonium peroxidisulfate is added dropwise over four hours. After addition is complete, the material is post-polymerized for one hour at 80° C. and, after addition of 0.45 part of ammonium peroxidisulfate, is post-polymerized for a further hour at 80° C.

The dispersion obtained is free of coagulate and has a solids content of 29–30 percent.

The average particle diameter is 2.0 to 2.5 microns.

(1.2) Cross-linked Polymethylmethacrylate

The method described in part (A) above is employed, except that in both stages the same amount of methyl methacrylate is used instead of styrene.

The dispersion contains about one percent of coagulate in the second stage and has a solids content of 29–30 percent. The average particle size diameter is about 2.0 microns.

(1.3) Cross-linked Copolymer of Methyl Methacrylate/Isobutyl Methacrylate

The process described in (A) is followed with the exception that, instead of styrene, the same amount of a mixture of methyl methacrylate and isobutyl methacrylate in a weight ratio of 1:1 is employed.

A coagulate-free dispersion with a solids content of 29–30 percent is obtained. The average particle size diameter is about 2.0–3.0 microns.

(1.4) Cross-linked Copolymer of Methyl Methacrylate/Isobutyl-Methacrylate/Styrene The process described in (A) is followed using a mixture of methyl methacrylate, isobutyl methacrylate, and styrene in a weight ratio of 50:30:20.

EXAMPLE 2

Practical Applications

Test 1

A plasticized PVC-foam synthetic leather was given a final coating of a solution of the following composition, containing 10.75 percent of binder solids:

100 parts of a copolymer of
    47 parts of methyl methacrylate,
    47 parts of n-butyl methacrylate, and
    6 parts of hydroxyethyl acrylate
150 parts of butyl acetate
290 parts of methylethyl ketone
170 parts of toluene
280 parts of ethyl acetate
10 parts of a polyfunctional aromatic isocyanate (binder component)
    (75 percent solution in ethyl acetate)
    (commercially available under the tradename "DESMODUR L").

Application was by means of a spiral doctor blade. The coating was dried for five minutes at 100° C. The amount of dry substance applied was 8 g/m².

Tests 2–5

Test 1 was repeated with the difference that from 1 to 3 percent, by weight of the solution (equivalent to about 10 to 30 percent, by weight of the binder therein), of a synthetic resin powder according to Examples 1.1–1.4 was stirred into the final lacquer solution.

Luster and slip properties of the lacquered surfaces on the finally-lacquered plasticized PVC-foam artificial leather were comparatively judged.

The following measuring criteria were used.

| Evaluation | Shine | Slipperiness |
|---|---|---|
| 1 | High luster | Slips without resistance |
| 2 | Lustrous | Slips with slight resistance |
| 3 | Light matte effect | Slips with resistance |
| 4 | Matte effect | No slip |

The results obtained are presented in the following Table.

| Test | Addition of Synthetic Resin Powder | Luster | Slip Properties |
|---|---|---|---|
| 1 | — | 1 | 4 |
| 2a | 1% according to Example 1.1 | 2 | 3 |
| 2b | 3% according to Example 1.1 | 3 | 2 |
| 3a | 1% according to Example 1.2 | 2 | 3 |
| 3b | 3% according to Example 1.2 | 4 | 1 |
| 4a | 1% according to Example 1.3 | 1–2 | 2 |
| 4b | 3% according to Example 1.3 | 2–3 | 1–2 |
| 5a | 1% according to Example 1.4 | 1–2 | 2–3 |
| 5b | 3% according to Example 1.4 | 2 | 1–2 |

EXAMPLE 3

A polyamide taffeta fabric having a weight of 70 g/m² and pre-coated with 12–14 g/m² of a cross-linked copolymer of butyl acrylate/acrylonitrile (15:1) is coated with one of two coating pastes, A or B, the compositions of which are given below in parts by weight:

(A)
  900 parts of a 50% (by weight) aqueous dispersion of a self-cross-linking polyethylacrylate binder,
  25 parts of a 30% aqueous solution of a copolymer of ethyl acrylate and methacrylic acid, as a thickening agent,
  10 parts of 10% aqueous phosphoric acid,
  10 parts of 25% aqueous ammonia, and
  55 parts of water.

(B) The same paste as in (A) is used, but 50 parts by weight of the synthetic resin powder of Example 1.3 (corresponding with about 10% by weight of the binder present) are added to the paste prior to addition of the ammonia.

14–18 g/m² (8–10 g/m² of dry solids) of each of pastes (A) and (B) are applied with a floating knife onto samples of the fabric and dried for two minutes at 140° C.

The slipperiness of the (A) coated fabric was evaluated as 2–3 using the criteria of Example 2, while that of fabric coated with (B) was evaluated as 1.

What is claimed is:

1. A synthetic resin powder of latex particles having an average particle size between 1 micron and 5 microns, which particles can be partially or completely loosely aggregated to form larger particles, said synthetic resin being a cross-linked copolymer of 75 to 99.5 percent by weight of a monomer mixture of methyl methacrylate and isobutyl methacrylate in a weight ratio of 1:3 to 3:1, 0.5 to 10 percent by weight of a cross-linking comonomer having at least two polymerizable double bonds, and 0 to 24.5 percent by weight of a further different ethylenically-unsaturated comonomer copolymerizable therewith.

2. A coating agent containing a volatile liquid component, a film-forming binder, and a synthetic resin powder of latex particles as in claim 1.

3. A coating agent as in claim 2 wherein said binder is an acrylic resin.

4. A coating agent as in claim 2 wherein said binder is present in the form of a solution in the liquid component and said latex particles are distributed in the solution.

5. A coating agent as in claim 2 wherein said liquid component is water and said binder is an emulsion polymer dispersed therein.

6. A method for the preparation of a non-blocking and non-tacky coating on a solid substrate, which method comprises coating said substrate with a coating agent as in claim 2 and evaporating the volatile component thereof to form a film on the substrate.

7. A method as in claim 6 wherein said substrate comprises a plasticized polyvinyl chloride.

\* \* \* \* \*

UNITED STATES PATENT AND TRADEMARK OFFICE
CERTIFICATE OF CORRECTION

PATENT NO. : 4,268,549
DATED : May 19, 1981
INVENTOR(S) : Herbert Fink et al.

It is certified that error appears in the above-identified patent and that said Letters Patent are hereby corrected as shown below:

In the left hand column of the cover- or title-page, between the items identified as "[22]" and "[51]", insert --[30] Foreign Application Priority Data July 31, 1978 [DE] Fed. Rep. of Germany 2833601--.

Signed and Sealed this

Twenty-ninth Day of September 1981

[SEAL]

Attest:

Attesting Officer

GERALD J. MOSSINGHOFF

Commissioner of Patents and Trademarks